US010023416B2

(12) United States Patent
Kimura et al.

(10) Patent No.: US 10,023,416 B2
(45) Date of Patent: Jul. 17, 2018

(54) INTER-ROLLER CONVEYANCE CONTROL DEVICE

(71) Applicant: Mitsubishi Electric Corporation, Chiyoda-ku (JP)

(72) Inventors: Masaya Kimura, Tokyo (JP); Hidetoshi Ikeda, Tokyo (JP); Akio Saito, Tokyo (JP); Yoshihiro Marushita, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 98 days.

(21) Appl. No.: 15/308,698

(22) PCT Filed: Mar. 18, 2015

(86) PCT No.: PCT/JP2015/058082
§ 371 (c)(1),
(2) Date: Nov. 3, 2016

(87) PCT Pub. No.: WO2015/178084
PCT Pub. Date: Nov. 26, 2015

(65) Prior Publication Data
US 2017/0174461 A1 Jun. 22, 2017

(30) Foreign Application Priority Data
May 23, 2014 (JP) ................................ 2014-107018

(51) Int. Cl.
G05B 13/02 (2006.01)
B65H 23/18 (2006.01)
B65H 18/10 (2006.01)

(52) U.S. Cl.
CPC ....... *B65H 23/1806* (2013.01); *B65H 18/103* (2013.01); *G05B 13/02* (2013.01); *B65H 2513/11* (2013.01); *B65H 2515/31* (2013.01)

(58) Field of Classification Search
CPC .............. B65H 23/1806; B65H 18/103; B65H 2515/31; B65H 2513/11; G05B 13/02
See application file for complete search history.

(56) References Cited

U.S. PATENT DOCUMENTS

| 4,159,808 | A | * | 7/1979 | Meihofer | ........... | B65H 23/1955 |
|---|---|---|---|---|---|---|
| | | | | | | 242/413.1 |
| 2004/0173708 | A1 | * | 9/2004 | Neumann | ............ | B65H 18/103 |
| | | | | | | 242/412.3 |

(Continued)

FOREIGN PATENT DOCUMENTS

JP 58-68106 A 4/1983
JP 63-35102 U 3/1988

(Continued)

OTHER PUBLICATIONS

International Search Report dated Jun. 16, 2015 in PCT/JP15/058082 Filed Mar. 18, 2015.

*Primary Examiner* — Sang K Kim
(74) *Attorney, Agent, or Firm* — Oblon, McClelland, Maier & Neustadt, L.L.P.

(57) ABSTRACT

An inter-roller conveyance control device conveying an object to be conveyed between a speed shaft roller driven by a speed shaft motor and a tension shaft roller driven by a tension shaft motor while providing tension to the object includes a gain table that stores a plurality of pairs of a conveyance condition variable changing while the object to be conveyed is conveyed and affecting an appropriate value of a control parameter and a control parameter candidate value that is an appropriate control parameter where, when the conveyance condition variable is changed, the device performs calculation on the basis of the conveyance condition variable and a gain calculation result and writes, into the gain table, the control parameter candidate value and the (Continued)

conveyance condition variable in association with each other when the calculation is completed.

8 Claims, 10 Drawing Sheets

(56) References Cited

U.S. PATENT DOCUMENTS

| | | | |
|---|---|---|---|
| 2011/0137451 A1 | 6/2011 | Schultze et al. | |
| 2016/0318726 A1* | 11/2016 | Ikeda | B65H 18/145 |
| 2016/0340140 A1* | 11/2016 | Onodera | B65H 23/1806 |
| 2017/0267481 A1* | 9/2017 | Onodera | B65H 23/1806 |

FOREIGN PATENT DOCUMENTS

| | | |
|---|---|---|
| JP | 1-176768 A | 7/1989 |
| JP | 1-303258 A | 12/1989 |
| JP | 5-748 A | 1/1993 |
| JP | 8-161004 A | 6/1996 |
| JP | 10-250888 A | 9/1998 |
| JP | 2003-67006 A | 3/2003 |
| JP | 2011-14031 A | 1/2011 |
| JP | 2011-529588 A | 12/2011 |
| JP | 2013-173598 A | 9/2013 |

* cited by examiner

INTER-ROLLER CONVEYANCE CONTROL DEVICE

FIELD

The present invention relates to an inter-roller conveyance control device.

BACKGROUND

A conventional inter-roller conveyance control device is adapted to control the conveyance of an object to be conveyed between two rollers while applying tension thereto in order that the conveyed object does not become slack between the two rollers. Accordingly, the inter-roller conveyance control device often includes a tension control calculation unit that performs a calculation involved in feedback control including PI control, i.e., proportional integral control, or PID control, i.e., proportional integral and derivative control, such that the tension applied to the object to be conveyed corresponds to the tension being set. On the basis of the calculation performed in the feedback control, the tension control calculation unit corrects a speed command for a tension shaft being one of two shafts of the two rollers and adjusts a difference in speed between the shaft and a speed shaft being the other shaft to control the tension generated in the object to be conveyed between the rollers. In order for the inter-roller conveyance control device to stably convey the object to be conveyed, it is required to stably perform the tension control and properly set a gain of a tension controller. In a general inter-roller conveyance control device, a user observes a variation in the tension while performing inter-roller conveyance and changes a control gain through trial and error, which takes much time and effort to perform the adjustment as well as causes variations in stability depending on proficiency of the user.

Patent Literature 1 discloses an example of a technique that automatically adjusts the control gain of the tension control calculation unit by including a control gain change necessity determination unit in the inter-roller conveyance control device, setting the control gain high in an initial conveyance operation and, when the waveform of a detected tension value is oscillatory, gradually reducing the control gain by a determination of the change necessity determination unit to search for an appropriate control gain.

CITATION LIST

Patent Literature

Patent Literature 1: Japanese Patent Application Laid-Open No. 2013-173598

SUMMARY

Technical Problem

According to the above conventional technique, the control gain set to an inappropriate value is lowered gradually by the automatic adjustment performed in the initial conveyance operation, but a range of reduction of the control gain cannot be determined and thus needs to be set to a value smaller than necessary in an actual operation. Therefore, it is required to repeat over and over again the operation of checking a response waveform on the detected tension value and making a determination to change the control gain and the operation of reducing the control gain. This has caused a problem that it takes time to search for the appropriate control gain.

Moreover, according to the conventional technique, it is assumed to perform the automatic adjustment only once at the initial conveyance operation. The response performance of the tension control calculation unit is set well just after the automatic adjustment in the initial conveyance operation but becomes unsatisfactory as a conveyance condition is changed.

The present invention has been made in view of the aforementioned problems. An objective of the present invention is to provide an inter-roller conveyance control device that does not require searching for the control gain by increasing and decreasing the control gain of the tension control while the object to be conveyed is conveyed between rollers but that can immediately adjust the control gain to an appropriate value, even when the conveyance condition such as a conveyance speed and/or a roller diameter of the object to be conveyed is changed, and can always realize favorable response performance of the tension control.

Solution to Problem

In order to solve the problem and achieve the objective mentioned above, the present invention relates to an inter-roller conveyance control device that conveys an object to be conveyed between a speed shaft roller and a tension shaft roller while providing tension. The inter-roller conveyance control device includes: a control tension detector that detects a control tension value of the object to be conveyed; a tension control calculation unit that calculates and outputs a tension control correction value such that a tension deviation is decreased, the calculation being on a basis of a control parameter and a tension deviation that is a deviation between a set tension command value and the control tension value; an adjustment execution command generation unit that turns on an adjustment execution command that is an on or off-signal from an external input, and turns off the adjustment execution command after an adjustment period; an excitation signal generation unit that, when the adjustment execution command is turned on, adds an added value for adjustment to the tension control correction value while the object to be conveyed is being conveyed; a tension shaft speed controller that receives, as input, a tension shaft speed command value obtained by summing the tension control correction value, the added value for adjustment, and a tension shaft speed reference command value, and performs control such that a conveyance speed of the tension shaft roller corresponds to the tension shaft speed command value; a speed shaft speed controller that receives, as input, a speed shaft speed command value that changes in synchronization with the tension shaft speed reference command value, and performs control such that a conveyance speed of the speed shaft roller corresponds to the speed shaft speed command value; a gain calculation unit that calculates, on the basis of the tension deviation in the adjustment period during which the adjustment execution command is turned on, a control parameter candidate value, as an appropriate control parameter, and outputs the control parameter candidate value; a gain table generation unit that, after calculation by the gain calculation unit is completed, associates the control parameter candidate value with a conveyance condition variable that changes while the object to be conveyed is being conveyed and that affects an appropriate value of the control parameter; and a gain table that stores therein a plurality of pairs of the conveyance condition variable and the control parameter candidate value.

Advantageous Effects of Invention

According to the present invention, an inter-roller conveyance control device can be provided that does not require searching for the control gain by increasing and decreasing the control gain of the tension control while the object to be conveyed is conveyed between rollers, but that can immediately adjust the control gain to the appropriate value even when the conveyance conditions such as the conveyance speed and/or roller diameter of the object to be conveyed are changed and can always provide favorable response performance of the tension control.

DESCRIPTION OF EMBODIMENTS

Exemplary embodiments of an inter-roller conveyance control device according to the present invention is described in detail with reference to the drawings. Note that the present invention is not limited to the embodiments.

First Embodiment

Figure 1:
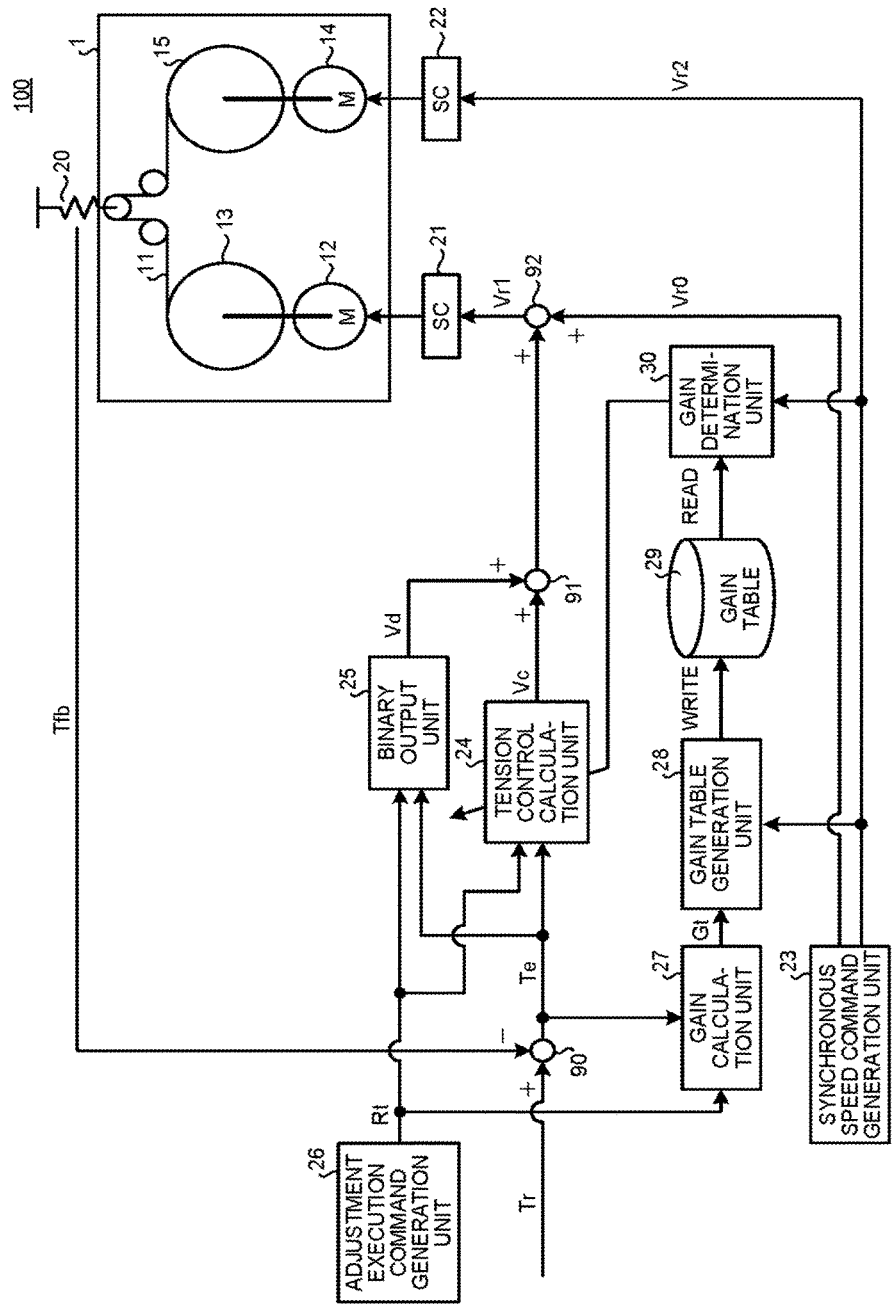
FIG. 1 is a block diagram illustrating the configuration of an inter-roller conveyance control device according to a first embodiment.

FIG. 1 is a block diagram illustrating the configuration of a first embodiment of an inter-roller conveyance control device according to the present invention. An inter-roller conveyance control device 100 illustrated in FIG. 1 includes an inter-roller conveyance mechanism 1. The inter-roller conveyance mechanism 1 includes an object to be conveyed 11, a tension shaft motor 12, a tension shaft roller 13, a speed shaft motor 14 and a speed shaft roller 15. The object to be conveyed 11 is conveyed between the tension shaft roller 13 and the speed shaft roller 15. The inter-roller conveyance mechanism 1 is a mechanism that conveys the object to be conveyed 11, which is belt-like or linear shaped, among a plurality of rollers and causes the tension shaft motor 12 to drive the tension shaft roller 13 so that it rotates and the object to be conveyed 11 is wound around the tension shaft roller 13, i.e., rolling up is performed. The object to be conveyed 11 is made of material such as paper, resin, fiber or metal, for example. The inter-roller conveyance mechanism 1 also causes the speed shaft motor 14 to drive the speed shaft roller 15 so that it rotates and the object to be conveyed 11 is unwound therefrom, i.e., rolling-off is performed.

A control tension detector 20 is attached to the inter-roller conveyance mechanism 1. The control tension detector 20 outputs a value obtained by detecting the tension in the object to be conveyed 11, i.e., a detected tension value Tfb, which is a controlled tension value. The detected tension value Tfb is a variable that is controlled to serve as a tension command value, which is described later.

Even though the present embodiment uses the tension shaft roller 13 to perform rolling-up and the speed shaft roller 15 to perform rolling-off, the present invention is not limited to such a configuration. That is, the speed shaft roller 15 can perform rolling-up and the tension shaft roller 13 performs rolling-off. Alternatively, each of the tension shaft roller 13 and the speed shaft roller 15 can be an intermediate shaft that performs only a feed operation during rolling-up or rolling-off and can be an intermediate shaft that performs neither rolling-up nor rolling-off.

The inter-roller conveyance control device 100 illustrated in FIG. 1 includes the control tension detector 20, a tension shaft speed controller 21, a speed shaft speed controller 22, a synchronous speed command generation unit 23, a tension control calculation unit 24, a binary output unit 25, an adjustment execution command generation unit 26, a gain calculation unit 27, a gain table generation unit 28, a gain table 29, a gain determination unit 30, a subtractor 90, an adder 91, and an adder 92.

The tension shaft speed controller 21 receives a tension shaft speed command value Vr1 as an input to control the rotational speed of the tension shaft motor 12 such that the speed of the object to be conveyed 11 being conveyed by the tension shaft roller 13 substantially corresponds to the tension shaft speed command value Vr1. Specifically, the tension shaft speed controller 21 performs control such that the rotational speed of the tension shaft motor 12 substantially corresponds to a command obtained by converting the tension shaft speed command value Vr1 into the rotational speed of the tension shaft motor 12 on the basis of the diameter and the reduction ratio of the tension shaft roller 13.

The speed shaft speed controller 22 receives a speed shaft speed command value Vr2 as an input to control the rotational speed of the speed shaft motor 14 such that the speed of the object to be conveyed 11 being conveyed by the speed shaft roller 15 substantially corresponds to the speed shaft speed command value Vr2. Specifically, the speed shaft speed controller 22 performs control such that the rotational speed of the speed shaft motor 14 substantially corresponds to a command obtained by converting the speed shaft speed command value Vr2 into the rotational speed of the speed shaft motor 14 on the basis of the diameter and the reduction ratio of the speed shaft roller 15.

The synchronous speed command generation unit 23 outputs a tension shaft speed reference command value Vr0 that is used to calculate the tension shaft speed command value Vr1 as well as the speed shaft speed command value Vr2. The tension shaft speed reference command value Vr0 and the speed shaft speed command value Vr2 are usually identical values or values taking into account the effect of any elongation of the object to be conveyed 11, and the values are generated so as to change synchronously according to the acceleration and deceleration of the conveying of the object to be conveyed 11.

The adjustment execution command generation unit 26 generates an adjustment execution command Rt, which is a signal representing on or off due to an instructional input made by an external operation, for example. The adjustment execution command generation unit 26 generally changes the adjustment execution command Rt from off to on in response to an external operation and it outputs the on-signal only for an "automatic adjustment period" and then changes the signal back to the off-signal. Here, the "automatic adjustment period" refers to a certain predetermined period or a period up to a time point at which output from the binary output unit 25 (to be described later) is determined to have changed by a number of times that corresponds to a threshold, for example.

The tension control calculation unit 24 receives, as input, the adjustment execution command Rt and a deviation between a tension command value Tr, which is set, and the detected tension value Tfb, which is the controlled tension value, i.e., a tension deviation Te that is a controlled tension deviation. The tension control calculation unit 24 then outputs the sum of a proportional compensation and an integral compensation as a tension control correction value Vc in a normal state in which the adjustment execution command Rt is turned off, where the proportional compensation is obtained by multiplying the tension deviation Te by a proportional gain that is a control parameter, and the integral compensation is obtained by multiplying the tension deviation Te by an integral gain that is a control parameter so as to be integrated. When the adjustment execution command Rt is turned on to cause the device to enter the automatic adjustment period, the tension control correction value Vc, which is the output, holds a value just before entering the automatic adjustment period during which the adjustment execution command Rt is turned on and outputs a fixed value. The operation of holding the last value can be implemented by setting the proportional gain and the integral gain to zero and retaining the output of the integration, for example.

The binary output unit 25 is an excitation signal generation unit. The binary output unit 25 operates during the automatic adjustment period during which the adjustment execution command Rt is turned on, and it outputs one of two values +D and −D, each having a preset added-value amplitude D, as the added value for adjustment addition Vd on the basis of the tension deviation Te. Specifically, the binary output unit 25 selects either +D or −D according to the sign of the tension deviation Te. The selection can correspond to the sign of a result of applying a low pass filter to the tension deviation Te, or, instead of simply making a selection according to the sign of the tension deviation Te, the selection can be made between +D and −D on the basis of a signal indicating the tension deviation Te, which has non-linear hysteresis characteristics.

Here, the binary output unit 25 operates on a method similar to what is called a limit cycle method used in temperature control, where the added value for adjustment addition Vd and the tension deviation Te output by the binary output unit 25 oscillate when the adjustment execution command Rt is turned on. The limit cycle method does not require a parameter to be set by a user so that the control parameter can be adjusted in a short period of time.

The gain calculation unit 27 receives the tension deviation Te and the adjustment execution command Rt as inputs; measures an oscillation period and an amplitude of the tension deviation Te in the automatic adjustment period during which the adjustment execution command Rt is turned on; and, on the basis of a result of the measurement, calculates a proportional gain candidate value and an integral gain candidate value that are candidates for the proportional gain and the integral gain of the tension control calculation unit 24, respectively. Specifically, the gain calculation unit 27 calculates the proportional gain candidate value by multiplying a reciprocal of the amplitude of the tension deviation Te by a constant; and calculates the integral gain candidate value, which is an integration time constant of a proportional integral calculation, by multiplying the oscillation period by a constant. A gain calculation completion signal, which an on- or off-signal, is turned on at a point when the adjustment execution command Rt is turned off as well as when the calculation of the proportional gain candidate value and the integral gain candidate value is completed. The gain calculation completion signal can also be referred to as a calculation completion signal. The gain calculation completion signal is turned on once and then turned back off. The gain calculation unit 27 outputs a gain calculation result Gt including the calculated proportional gain candidate value and integral gain candidate value as well as the gain calculation completion signal.

The gain table generation unit 28 receives the gain calculation result Gt and the speed shaft speed command value Vr2 as input; uses the value of the speed shaft speed command value Vr2 as the conveyance condition variable to associate the conveyance condition variable with each of the proportional gain candidate value and the integral gain candidate value included in the gain calculation result Gt; and writes the proportional gain candidate value and the integral gain candidate value associated with the conveyance condition variable and the speed shaft speed command value Vr2 into the gain table 29. The gain table generation unit 28 writes the data into the gain table 29 at a time point when the gain calculation completion signal included in the received gain calculation result Gt is turned on.

The gain table 29 stores a plurality of the conveyance condition variables and a pair made up of the proportional gain candidate value and the integral gain candidate value associated with each conveyance condition variable. The gain table 29 is a storage medium that can be adapted such that information can be written into or read from the medium by performing an external operation and it is not limited to a specific configuration. The storage medium can be a flash memory or a hard disk drive, for example.

Figure 2:
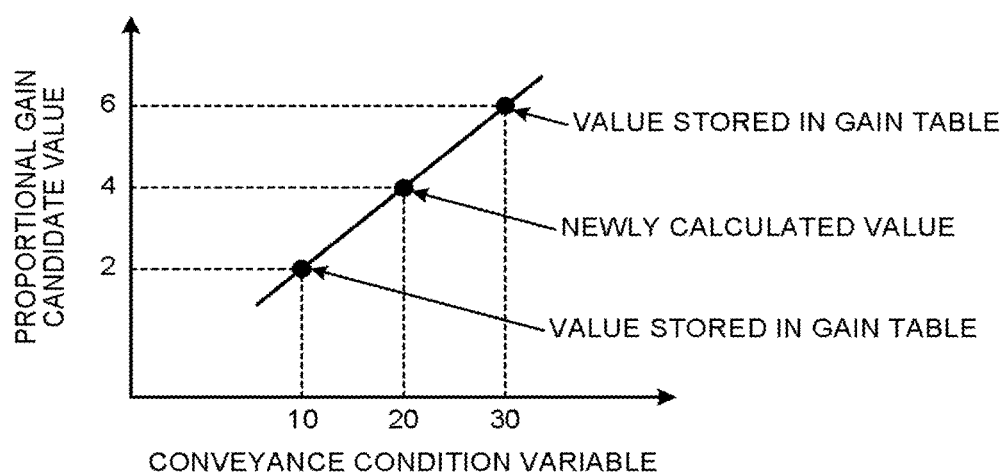
FIG. 2 is a diagram illustrating an example of a graph on which a candidate value stored in a gain table and a candidate value that is newly calculated are plotted with a horizontal axis representing a conveyance condition variable of the first embodiment.

The gain determination unit 30 receives the speed shaft speed command value Vr2 as input; reads, from the gain table 29, the proportional gain candidate value and the integral gain candidate value associated with the conveyance condition variable corresponding to the speed shaft speed command value Vr2 being received; and sets or changes the values that are the values of the proportional gain and the integral gain of the tension control calculation unit 24. At this time, among the proportional gain candidate values and the integral gain candidate values stored in the gain table 29, the gain determination unit 30 can be adapted to read the proportional gain candidate value and the integral gain candidate value associated with the conveyance condition variable closest to the conveyance condition variable corresponding to the speed shaft speed command value Vr2 being received, or it can be adapted to read a plurality of each of the proportional gain candidate values and the integral gain candidate values and to calculate a new proportional gain candidate value and an integral gain candidate value, as illustrated in FIG. 2, on the basis of the values being read. Thus the gain determination unit 30 receives the conveyance condition variable as input and changes the control parameter of the tension control calculation unit 24 on the basis of the control parameter candidate value read from the gain table 29 as described above; therefore, the control parameter appropriate for the conveyance condition is used in tension control from among the plurality of pairs of control parameters stored in the gain table 29, whereby a user can easily change the control parameter accompanying a change in the conveyance condition.

FIG. 2 is a diagram illustrating an example of a graph on which the candidate value stored in the gain table 29 and the candidate value that is newly calculated are plotted with a horizontal axis representing the conveyance condition variable. In the example illustrated in FIG. 2, when the conveyance condition variable of "20" is input to the gain determination unit 30 and the gain table 29 stores the proportional gain candidate value "2" associated with the conveyance condition variable "10" and the proportional gain candidate value "6" associated with the conveyance condition variable "30", for example, then the gain determination unit 30 can read the proportional gain candidate values "2" and "6" associated with the conveyance condition variables "10" and "30" so as to newly calculate the proportional gain candidate value "4" on the basis of the fact that the conveyance condition variable "20" is a middle value between the conveyance condition variables stored in the table. The gain determination unit 30 corrects the control parameter candidate value read from the gain table 29 and changes the value of the control parameter of the tension control calculation unit 24 as described above; therefore, an appropriate control parameter can be obtained at all times by performing interpolation by referring to a plurality of values even in a case where the gain table 29 stores discrete values.

The subtractor 90 outputs a value obtained by subtracting the detected tension value Tfb from the tension command value Tr as the tension deviation Te.

The adder 91 outputs a value obtained by adding the added value for adjustment addition Vd to the tension control correction value Vc.

The adder 92 outputs a value obtained by adding the tension shaft speed reference command value Vr0 and the value output by the adder 91 together as the tension shaft speed command value Vr1. The adder 92 is a tension shaft speed command value generation unit.

Effects obtained by the inter-roller conveyance control device 100 of the present embodiment are described here.

When the adjustment execution command generation unit 26 turns on the adjustment execution command Rt in a state where the tension control calculation unit 24 has poor responsiveness, such as at the boot-up of the inter-roller conveyance control device 100, the proportional gain and the integral gain of the tension control calculation unit 24 are inappropriately adjusted. Therefore, the added value for adjustment addition Vd takes +D or −D according to the positive or negative sign of the tension deviation Te in an adjustment period during which the adjustment execution command Rt output by the adjustment execution command generation unit 26 is turned on. This causes the tension deviation Te to change and the added value for adjustment addition Vd so as to make the tension deviation Te oscillate. That is, a self-excited oscillation is generated by the limit cycle.

Figure 3:
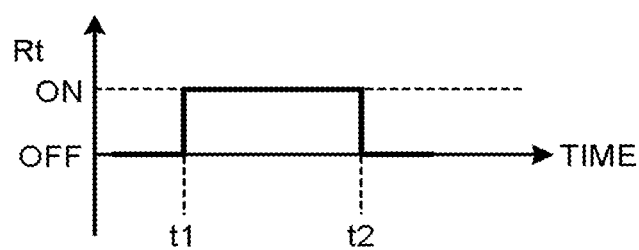
FIG. 3 is a time response graph of an adjustment execution command Rt of the inter-roller conveyance control device according to the first embodiment.
Figure 4:
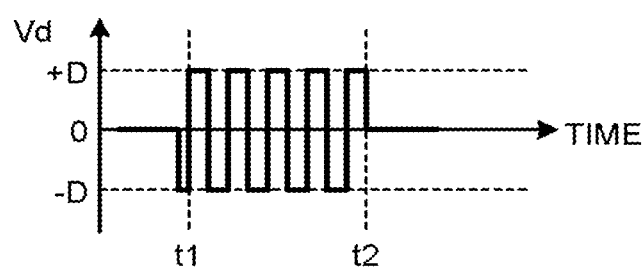
FIG. 4 is a time response graph of an added value for adjustment addition Vd in the inter-roller conveyance control device according to the first embodiment.
Figure 5:
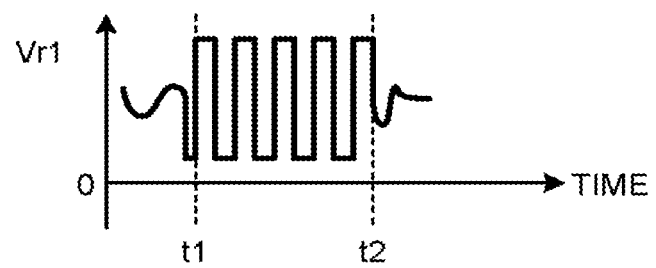
FIG. 5 is a time response graph of a tension shaft speed command value Vr1 of the inter-roller conveyance control device according to the first embodiment.
Figure 6:
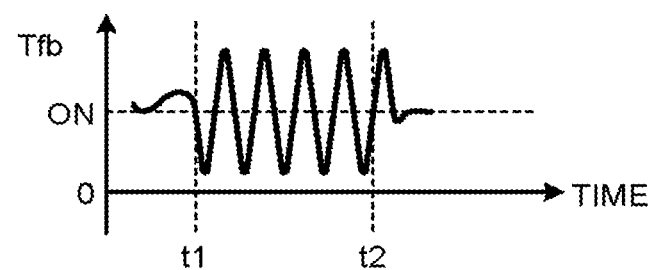
FIG. 6 is a time response graph of a detected tension value Tfb of the inter-roller conveyance control device according to the first embodiment.

Each of FIGS. 3 to 6 illustrates an example of a time response of the added value for adjustment addition Vd and the detected tension value Tfb. Each of FIGS. 3 to 6 is a diagram illustrating a time response graph representing the behavior of the inter-roller conveyance control device 100 according to the present embodiment have a horizontal axis representing time. FIG. 3 is the time response graph for the adjustment execution command Rt of the inter-roller conveyance control device 100 according to the present embodiment. FIG. 4 is the time response graph for the added value for adjustment addition Vd of the inter-roller conveyance control device 100 according to the present embodiment. FIG. 5 is the time response graph for the tension shaft speed command value Vr1 of the inter-roller conveyance control device 100 according to the present embodiment. FIG. 6 is the time response graph for the detected tension value Tfb of the inter-roller conveyance control device 100 according to the present embodiment. Times t1 and t2 on the horizontal axis indicate the same time among FIGS. 3 to 6.

The gain calculation unit 27 calculates the proportional gain candidate value and the integral gain candidate value of the tension control calculation unit 24 on the basis of the oscillation period and amplitude of the tension deviation Te during the adjustment period during which the adjustment execution command Rt is turned on, and at the same time the gain table generation unit 28 stores, into the gain table 29, the proportional gain candidate value and the integral gain candidate value calculated by the gain calculation unit 27 in association with the conveyance condition variable corresponding to the current speed shaft speed command value Vr2.

Here, the adjustment period during which the adjustment execution command Rt is turned on can be preset in duration as described above, i.e., it is a fixed period, but when a variety of materials ranging from hard metal to soft resin are to be conveyed, the oscillation frequency due to the limit cycle as well as the response frequency of control that can be realized vary greatly; therefore, it is desirable to set the adjustment period to end after a predetermined count of the oscillation frequency of the tension deviation Te. When the object to be conveyed 11 is made of material including metal and paper, which does not stretch much with a change in tension, the oscillation due to the limit cycle is generated at a speed of several Hz or faster so that the adjustment period need only last approximately one second. When the object to be conveyed 11 is made of material such as resin, which stretches to a large extent with the change in tension, the response of control that can be realized is also delayed but, even in such case, the adjustment period need only last approximately several seconds and at the same time an optimal gain can be calculated by a single adjustment operation.

Further, the gain determination unit 30 reads the proportional gain candidate value and the integral gain candidate value corresponding to the current speed shaft speed command value Vr2 from the gain table 29 and sets the values to be used in the tension control calculation unit 24, and therefore the response of the tension control calculation unit 24 is adjusted so that it is favorable.

When the aforementioned operation is performed under a plurality of different conveyance conditions corresponding to the speed shaft speed command value Vr2 in order to output a signal of the adjustment execution command Rt at a proper timing by an instructional input from an outside source, for example, a plurality of pairs of the proportional gain candidate values and the integral gain candidate values appropriate for each conveyance condition are associated therewith to be stored in the gain table 29. The inter-roller conveyance control device 100 of the present embodiment need only change the value of the tension control correction value Vc in the adjustment operation. Accordingly, the value of the speed shaft speed command value Vr2, which is the conveyance condition variable, does not need to be changed during the adjustment period; therefore, the conveyance condition variable is not affected and an appropriate control parameter can be calculated under each conveyance condition.

The proportional gain candidate value and integral gain candidate value appropriate for the plurality of conveyance conditions are stored in the gain table 29; therefore, when the conveyance condition is changed, the gain determination unit 30 selects the appropriate proportional gain candidate value and integral gain candidate value from among the values stored in the gain table 29 and applies the selected values to the tension control calculation unit 24, thereby saving a user of the inter-roller conveyance control device 100 from having to change the proportional gain and the integral gain of the tension control calculation unit 24 with the change in the conveyance condition in order to be able to obtain a favorable response.

Moreover, the proportional gain candidate value and the integral gain candidate value under the conveyance condition when the adjustment execution command Rt is turned on by performing an external operation on the adjustment execution command generation unit 26 are associated with the conveyance condition variable and stored one by one; therefore, the number of the conveyance conditions need not be determined in advance in order to generate the values stored in the gain table 29 and the values to be stored in the gain table 29 can easily be generated.

Generally, in the inter-roller conveyance control device, a change in the speed of the speed shaft roller due to a change in the conveyance speed of the object to be conveyed causes a change in the amount of the object to be conveyed being rolled off per hour, thereby causing a change in the characteristic of the tension generated with respect to a difference in the speed between the tension shaft roller and the speed shaft roller. There is a noticeable change in the characteristics of the tension generated with respect to the difference in the speed between the tension shaft roller and the speed shaft roller accompanying a change in the conveyance speed, especially when the object to be conveyed is made of material such as resin that is soft and stretchable. A conventional inter-roller conveyance control device is thus required to change the control parameter of the proportional gain or integral gain at each conveyance speed in order to check the response to the detected tension value and to search for an appropriate control parameter every time the conveyance speed of the object to be conveyed is changed. According to the inter-roller conveyance control device 100 of the present embodiment, when the conveyance speed of the object to be conveyed is changed, the adjustment execution command generation unit 26 turns on the adjustment execution command Rt in order to be able to calculate the proportional gain and the integral gain appropriate for the speed of the speed shaft at that time and to generate the values stored in the gain table 29.

Note that even though the control tension detector 20 outputs the detected tension value Tfb according to the aforementioned description, the detector need not itself detect and output the tension in the object to be conveyed 11 and it can be adapted to press a mechanism called a dancer against the object to be conveyed 11 to detect and output the dancer displacement, for example.

Therefore, the control tension detector 20 need not directly output the tension in the object to be conveyed 11 but can detect the controlled tension value, which is a variable and the output of which changes due to the effect of the variation in the tension, or it can detect a variable that is controlled such that it takes a constant value to allow the tension in the object to be conveyed 11 to be kept constant. In this case, the aforementioned detected tension value Tfb, tension command value Tr, and tension deviation Te can be replaced by an appropriate controlled tension value, tension command value, and controlled tension deviation as appropriate.

Moreover, the tension control calculation unit 24 in the present embodiment uses the control parameters that are a proportional gain and an integral gain obtained by proportional compensation and integral compensation. But, a derivative gain can also be added to the control parameter by adding derivative compensation.

Even though the speed shaft speed command value Vr2 is used as the conveyance condition variable in the present embodiment, the tension shaft speed reference command value Vr0 can be used as the conveyance speed variable in order to generate the value in the gain table storing the appropriate control parameter according to the plurality of different conveyance speeds.

Even though the inter-roller conveyance control device 100 of the present embodiment includes the gain determination unit 30 and another component having an automatic adjustment function, the control device can also be configured not to include the gain determination unit 30 and only generate the gain table 29 by using the automatic adjustment function. Further, in normal operation of the inter-roller conveyance control device, the control device can be configured to include the gain table 29 and the gain determination unit 30 but not to include the automatic adjustment function.

In the conventional techniques, the control gain set to an inappropriate value is reduced gradually by the automatic adjustment performed in the initial conveyance operation, but the range of reduction of the control gain cannot be determined and thus needs to be set to a value smaller than necessary in an actual operation. Therefore, it is required to repeatedly perform the operation of checking a response waveform of the detected tension value and to make a determination to change the control gain and the operation of reducing the control gain, and it takes time to search for an appropriate control gain.

Moreover, it is assumed in the conventional technique to perform the automatic adjustment only once in the initial conveyance operation when the same object to be conveyed is conveyed, but a fixed control gain cannot maintain favorable control in some cases due to a change in the conveyance condition, depending on the type of the object to be conveyed or the configuration of a conveyance mechanism. For example, a change in the conveyance speed of the object to be conveyed causes a change in the amount of the object to be conveyed being fed from a roll-off shaft per unit time, which causes a change in the speed of newly feeding the object to be conveyed between rollers and thus a change in a characteristic of the tension generated with respect to a difference in the speed between the tension shaft roller and the speed shaft roller. Moreover, as time elapses from the start of conveyance, a rolling-up shaft gradually gets thick by rolling up the object so as to cause a delay in time for the torque of the motor driving the rolling-up shaft to reach the surface of the roller whereas, as for the roll-off shaft, the time it takes for the torque of the motor to reach the surface of the roller is reduced so that the time it takes for the change in the speed of the motor to affect the tension varies in each case. When the roller diameter is very large, a small change in the torque of the motor is absorbed by the object to be conveyed wound around the roller and does not reach the surface of the roller in some cases. Therefore, a change in the roller diameter of the roll-off shaft or the rolling-up shaft occurring as time elapses from the start of conveying the object to be conveyed also causes the change in the characteristic of the tension generated with respect to the difference in the speed between the tension shaft roller and the speed shaft roller. In such a case, in order to always obtain favorable response performance of the tension control in the inter-roller conveyance control device, the control parameter of the feedback control performed by the tension control calculation unit needs to be changed as appropriate according to the conveyance condition including the conveyance speed. But, in the conventional technique in which the automatic adjustment is assumed to be performed only once in the initial conveyance operation, the tension control calculation unit can only provide favorable response performance right after the automatic adjustment is performed in the initial conveyance operation, but it cannot provide the same favorable response as the conveyance condition is changed.

The inter-roller conveyance control device 100 of the present embodiment is operated as described above to store, into the gain table, the pair made up of the proportional gain candidate value and the integral gain candidate value appropriate for the plurality of conveyance conditions. Therefore, the gain of the tension control calculation unit can be set to an appropriate value in a short time under the conveyance speed condition that is set independently of the status of a preset control gain of the tension control calculation unit without the need of trial and error or knowledge based on experience; and a user can easily perform control to convey the object to be conveyed between rollers while holding the tension at a desired value even when the conveyance condition is changed.

That is, according to the present embodiment, the inter-roller conveyance control device can be provided that does not require searching for the control gain by increasing and decreasing the control gain of the tension control while the object to be conveyed is conveyed between rollers, but that can immediately adjust the control gain to the appropriate value even when the conveyance condition including the conveyance speed of the object to be conveyed is changed and can realize favorable response performance of the tension control at all times.

Second Embodiment

The inter-roller conveyance control device 100 described in the first embodiment uses the speed shaft speed command value Vr2 as the conveyance condition variable and stores, into the gain table, the candidate values for the proportional gain and the integral gain associated with the conveyance condition variable, but the roller diameter of the tension shaft roller can instead be used as the conveyance condition variable. According to the present embodiment, a control gain appropriate for each roller diameter can be generated and stored into the gain table even when a characteristic of tension being generated is changed along with a change in the roller diameter of a roll.

Figure 7:
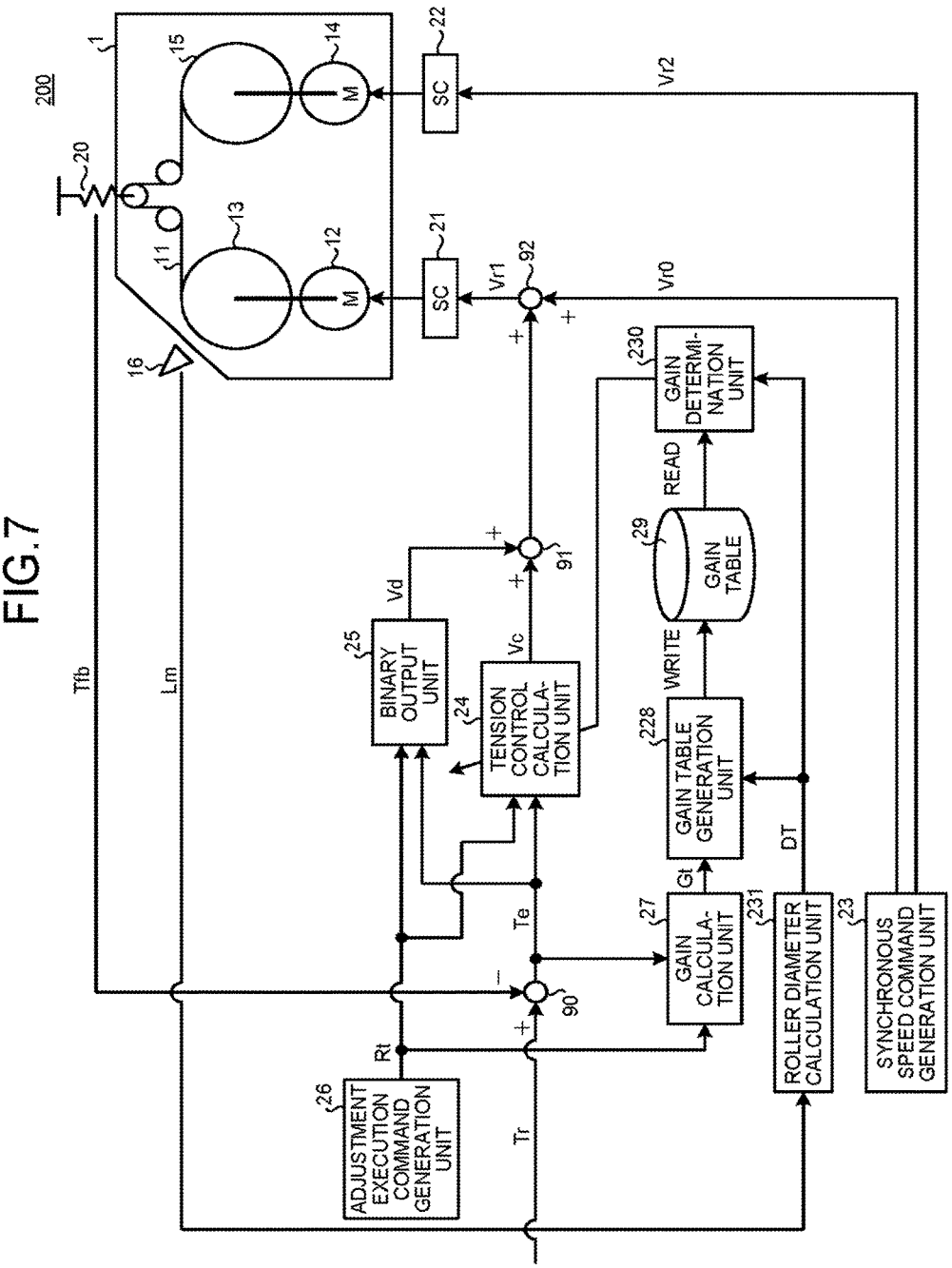
FIG. 7 is a block diagram illustrating the configuration of an inter-roller conveyance control device according to a second embodiment.

FIG. 7 is a block diagram illustrating the configuration of a second embodiment of an inter-roller conveyance control device according to the present invention. According to an inter-roller conveyance control device 200 illustrated in FIG. 7, a roller diameter of a tension shaft roller is stored as a conveyance condition variable into a gain table 29. Note that in FIG. 7, a block with the same reference numerals as those in FIG. 1 represent the same configuration as those of the first embodiment and thus will not be described.

The inter-roller conveyance control device 200 illustrated in FIG. 7 includes a roller diameter sensor 16, a control tension detector 20, a tension shaft speed controller 21, a speed shaft speed controller 22, a synchronous speed command generation unit 23, a tension control calculation unit 24, a binary output unit 25, an adjustment execution command generation unit 26, a gain calculation unit 27, a gain table generation unit 228, a gain table 29, a gain determination unit 230, a roller diameter calculation unit 231, a subtractor 90, an adder 91 and an adder 92.

The roller diameter sensor 16 is a laser displacement sensor or the like and can detect the position of a surface of a tension shaft roller 13 of which roller diameter increases and decreases. The roller diameter sensor 16 outputs a roller diameter sensor output value Lm.

The roller diameter calculation unit 231 receives the roller diameter sensor output value Lm as input to calculate and output a calculated roller diameter value DT being a radius or diameter of the tension shaft roller 13 on the basis of the roller diameter sensor output value Lm.

The gain table generation unit 228 receives, as input, the calculated roller diameter value DT and a gain calculation result Gt including a proportional gain candidate value, an integral gain candidate value and a gain calculation completion signal; and stores, into the gain table 29, the proportional gain candidate and the integral gain candidate included in the gain calculation result Gt in association with a conveyance condition variable corresponding to the calculated roller diameter value DT only when a gain calculation completion signal included in the gain calculation result Gt is turned on.

The gain determination unit 230 receives the calculated roller diameter value DT as input; reads, from the gain table 29, the proportional gain candidate value and the integral gain candidate value associated with the conveyance condition variable corresponding to the calculated roller diameter value DT being received; and sets the values as values of the proportional gain and the integral gain of the tension control calculation unit 24. At this time, among the proportional gain candidate values and the integral gain candidate values stored in the gain table 29, the gain determination unit 230 can read the proportional gain candidate value and the integral gain candidate value associated with the conveyance condition variable closest to the conveyance condition variable corresponding to the calculated roller diameter value DT being received; or can, as described with reference to FIG. 2 in the first embodiment, read a plurality of each of the proportional gain candidate values and the integral gain candidate values and can calculate new proportional gain candidate value and integral gain candidate value on the basis of the proportional gain candidate value and the integral gain candidate value being read.

According to the present embodiment, the adjustment execution command generation unit 26 turns on an adjustment execution command Rt under a plurality of conveyance conditions with different roller diameters and generates a limit cycle, in which a tension deviation Te and a tension shaft speed command value Vr1 oscillate in a fixed cycle as with the first embodiment. Therefore, the gain calculation unit 27 calculates the proportional gain candidate value and the integral gain candidate value on the basis of the tension deviation Te in an adjustment period during which the adjustment execution command Rt is turned on. The gain calculation result Gt, which includes the calculated proportional gain candidate value and integral gain candidate value as well as the gain calculation completion signal being turned on, is output at a point when the adjustment execution command Rt is turned off and the gain calculation unit 27 completes both the calculation of the proportional gain candidate value and the integral gain candidate value.

The gain table generation unit 228 stores the proportional gain candidate value and the integral gain candidate value associated with the conveyance condition variable into the gain table 29, the conveyance condition variable being the calculated roller diameter value DT.

Effects obtained by the inter-roller conveyance control device 200 of the present embodiment is described.

According to the inter-roller conveyance control device 200 illustrated in FIG. 7, a rolling-up shaft gradually gets thicker as the object to be conveyed is conveyed so as to cause a delay in time for the torque of a motor driving the rolling-up shaft to reach the surface of the roller whereas; as for a roll-off shaft, the time it takes for the torque of a motor to reach the surface of the roller is reduced, so that the time it takes for the change in the speed of the motor to affect the tension varies in each case. When the roller diameter is very large, a small change in the torque of the motor is absorbed by the object to be conveyed wound around the roller and it does not reach the surface of the roller in some cases. Accordingly, the change in the roller diameter of the roll-off shaft or the rolling-up shaft as time elapses from the start of conveying the object to be conveyed also causes a change in a characteristic of the tension generated with respect to a difference in speed between the tension shaft roller and a speed shaft roller.

That is, an appropriate value of the control parameter including the proportional gain and the integral gain used in the tension control calculation unit 24 varies as the roller diameter is changed.

According to the present embodiment, even when the roller diameter is changed while the object to be conveyed is conveyed, the adjustment execution command generation unit 26 turns on the adjustment execution command Rt so as to be able to set the proportional gain and the integral gain of the tension control calculation unit 24 appropriate for that roller diameter and maintain a favorable response in the tension control.

The proportional gain candidate value and the integral gain candidate value associated with the conveyance condition variable being the roller diameter are stored one by one into the gain table 29 so that the proportional gain candidate value and the integral gain candidate value appropriate for the value of each roller diameter can be stored into the gain table 29.

The values stored in the gain table 29 are discrete values with regard to the roller diameter that changes continuously. However, the gain determination unit 230 of the present embodiment can read a plurality of each of the proportional gain candidate values and the integral gain candidate values from the gain table 29 so as to generate a new candidate value on the basis of the plurality of the candidate values being read. Therefore, appropriate proportional gain candidate value and integral gain candidate value can be always applied to the tension control calculation unit 24 even when the roller diameter changes continuously.

The inter-roller conveyance control device 200 of the present embodiment is operated as described above to store, into the gain table, the pair made up of the proportional gain candidate value and the integral gain candidate value appropriate for each of the plurality of roller diameters of the tension shaft; so that the gain used in the tension control calculation unit can be set to an appropriate value in a short time independently of the status of a preset control gain of the tension control calculation unit and without the need of trial and error or knowledge based on experience; and so that a user can easily perform control to convey the object to be conveyed between rollers while holding the tension at a desired value even when the roller diameter is changed.

The roller diameter is calculated by using the roller diameter sensor 16 in the present embodiment, but the present invention can instead use another mechanism capable of estimating the roller diameter. The roller diameter can be calculated by a multiplication of the thickness of the object to be conveyed and the rotational speed of the rolling-up shaft, or on the basis of a ratio of the conveyance speed of the object to be conveyed 11 to the rotational speed of the tension shaft roller 13, for example. The inter-roller conveyance control device 200 of the present embodiment need only change the value of the tension control correction value Vc in the adjustment operation. Accordingly, the value of the roller diameter being the conveyance condition variable does not need to be manipulated in the adjustment period, so that the conveyance condition variable is not affected and that the appropriate control parameter can be calculated under each conveyance condition.

Third Embodiment

The inter-roller conveyance control device 100 described in the first embodiment uses the speed shaft speed command value Vr2 as the conveyance condition variable and stores, into the gain table, the candidate values for the proportional gain and the integral gain associated with the conveyance condition variable, but a time elapse from the start of conveyance as the conveyance condition variable can be used. According to the present embodiment, a control gain appropriate for each elapsed time can be generated and stored into the gain table even when a characteristic of tension being generated is changed along with the time elapse from the start of conveying an object to be conveyed.

Figure 8:
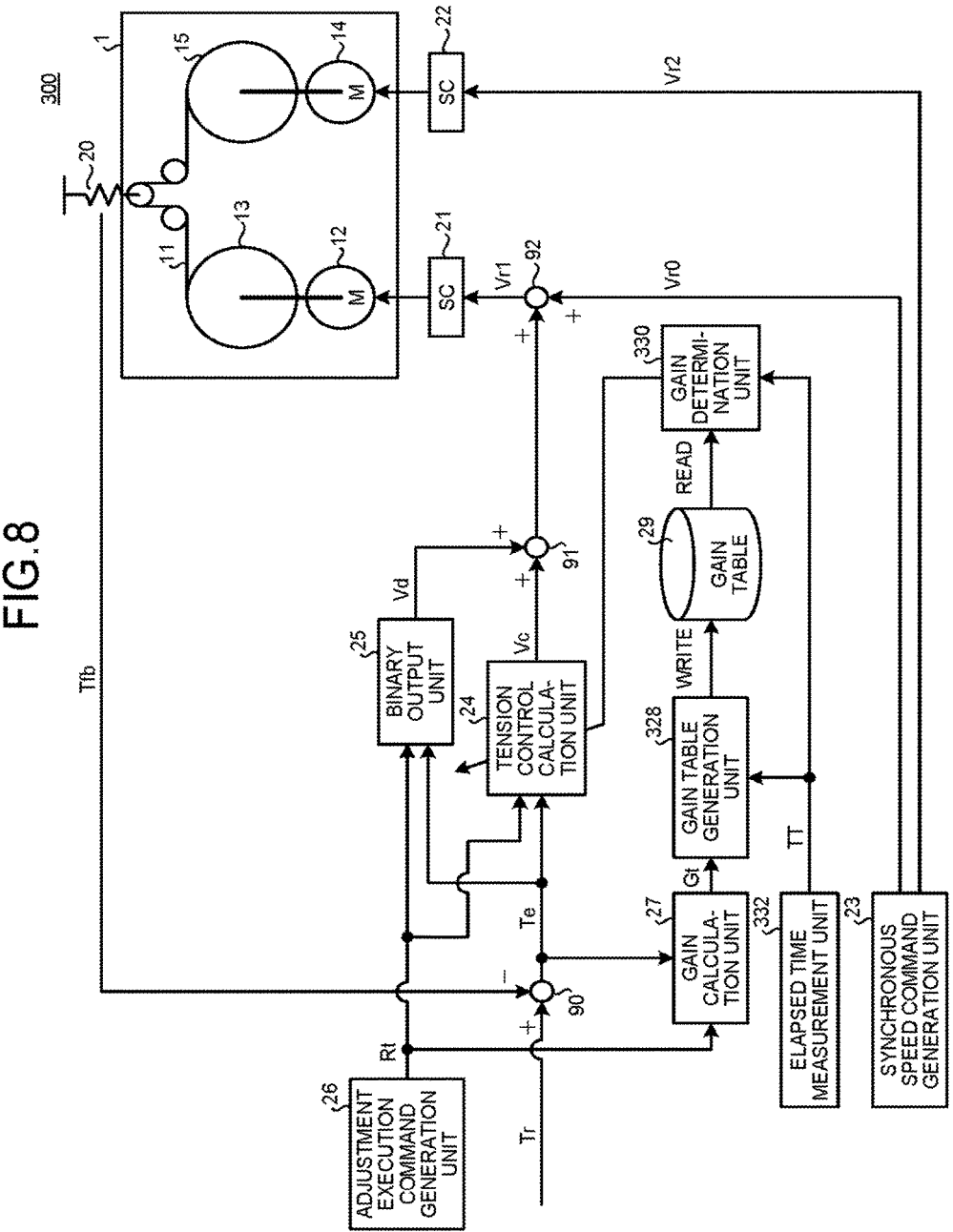
FIG. 8 is a block diagram illustrating the configuration of an inter-roller conveyance control device according to a third embodiment.

FIG. 8 is a block diagram illustrating the configuration of a third embodiment of an inter-roller conveyance control device according to the present invention. An inter-roller conveyance control device 300 illustrated in FIG. 8 uses the time elapse from the start of conveyance as the conveyance condition variable. In FIG. 8, a block with the same reference numeral as that in FIG. 1 represents the same configuration as that of the first embodiment and thus will not be described.

The inter-roller conveyance control device 300 illustrated in FIG. 8 includes a control tension detector 20, a tension shaft speed controller 21, a speed shaft speed controller 22, a synchronous speed command generation unit 23, a tension control calculation unit 24, a binary output unit 25, an adjustment execution command generation unit 26, a gain calculation unit 27, a gain table generation unit 328, a gain table 29, a gain determination unit 330, an elapsed time measurement unit 332, a subtractor 90, an adder 91, and an adder 92.

The elapsed time measurement unit 332 measures a time elapse from the time at which an original of an object to be conveyed 11 is attached to a speed shaft roller unwinding the object and starts to be conveyed. Note that when the conveyance operation is stopped due to some kind of problem with the inter-roller conveyance control device 300, the measurement of the elapsed time is paused until the conveyance operation resumes. The elapsed time being measured is output as a measured time value TT.

The gain table generation unit 328 receives as input the measured time value TT and a gain calculation result Gt including a proportional gain candidate value, an integral gain candidate value and a gain calculation completion signal; and stores, into the gain table 29, the proportional gain candidate and the integral gain candidate included in the gain calculation result Gt in association with a conveyance condition variable corresponding to the measured time value TT only when a gain calculation completion signal included in the gain calculation result Gt is turned on.

The gain determination unit 330 receives the measured time value TT as input; reads, from the gain table 29, the proportional gain candidate value and the integral gain candidate value associated with the conveyance condition variable corresponding to the measured time value TT being received; and sets the values as values of the proportional gain and the integral gain used in the tension control calculation unit 24. At this time, among the proportional gain candidate values and the integral gain candidate values stored in the gain table 29, the gain determination unit 330 can read the proportional gain candidate value and the integral gain candidate value associated with the conveyance condition variable closest to the conveyance condition variable corresponding to the measured time value TT being received; or as described with reference to FIG. 2 in the first embodiment, can read a plurality of each of the proportional gain candidate values and the integral gain candidate values and calculate new proportional gain candidate value and integral gain candidate value on the basis of the proportional gain candidate value and the integral gain candidate value being read.

According to the present embodiment, when response performance of the tension is changed with the lapse of a certain period of time from the start of conveyance, the adjustment execution command generation unit 26 turns on an adjustment execution command Rt so as to generate a limit cycle in which a tension deviation Te and a tension shaft speed command value Vr1 oscillate in a fixed cycle as with the first embodiment; and the gain calculation unit 27 calculates the proportional gain candidate value and the integral gain candidate value on the basis of the tension deviation Te in an adjustment period during which the adjustment execution command Rt is turned on. The gain calculation result Gt including the calculated proportional gain candidate value and integral gain candidate value as well as the gain calculation completion signal being turned on is output at a point when the adjustment execution command Rt is turned off and the gain calculation unit 27 finishes calculating the proportional gain candidate value and the integral gain candidate value.

The gain table generation unit 328 stores the proportional gain candidate value and the integral gain candidate value associated with the conveyance condition variable into the gain table 29, the measured time value TT being as the conveyance condition variable.

Effects obtained by the inter-roller conveyance control device 300 of the present embodiment is described.

When a conveyance speed of the object to be conveyed is controlled by a host controller in the inter-roller conveyance control device 300 illustrated in FIG. 8, for example, a sequence that determines the conveyance condition is in many cases uniquely determined by the host controller. That is, the roller diameter of a tension shaft can vary with the time elapse from the start of conveyance of the object to be conveyed newly placed and, the conveyance speed of the object to be conveyed can also vary with the time elapse from the start of conveyance.

In other words, the roller diameter of the tension shaft roller and the conveyance speed of the object to be conveyed vary depending on the time elapse from the start of conveyance, so that appropriate proportional gain and integral gain values used in the tension control calculation unit can vary depending on the time elapse from the start of conveyance.

According to the present embodiment, even when the response characteristic of the tension is changed with the time elapse from the start of conveying the object to be conveyed, the adjustment execution command generation unit 26 turns on the adjustment execution command Rt so as to be able to set the proportional gain and the integral gain of the tension control calculation unit 24 appropriate for the time elapse from the start of conveyance and maintain a favorable response in the tension control.

Moreover, the proportional gain candidate value and the integral gain candidate value associated with the conveyance condition variable being the time elapse from the start of conveying the object to be conveyed are stored one by one into the gain table 29, so that the proportional gain candidate value and the integral gain candidate value appropriate for the value of each roller diameter can be generated.

The inter-roller conveyance control device 300 of the present embodiment is operated as described above so as to store, into the gain table, a pair made up of the proportional gain candidate value and the integral gain candidate value appropriate for each time elapse from the start of conveyance. Therefore, the gain of the tension control calculation unit can be set to an appropriate value in a short time regardless the status of a preset control gain of the tension control calculation unit and without the need of trial and error or knowledge based on experience, and a user can easily perform control to convey the object to be conveyed between rollers while holding the tension at a desired value even when the conveyance condition is changed with the time elapse from the start of conveyance.

The time elapse from the start of conveying the object to be conveyed is used as the conveyance condition variable in the present embodiment, but the present invention is not limited to such a case. An integrated value of the angle of rotation of the speed shaft roller and an integrated value of the angle of rotation of the tension shaft roller from the start of conveying the object to be conveyed can be used as the conveyance condition variable instead of the time elapse from the start of conveying the object to be conveyed. The inter-roller conveyance control device 300 of the present embodiment needs only change the value of a tension control correction value Vc in an adjustment operation. As a result, there is no need to operate the inter-roller conveyance control device at low speed or halt it to perform an adjustment in the adjustment period; so that the time elapse from the start of conveyance being the conveyance condition variable is not affected and so that an appropriate control parameter can be calculated under each conveyance condition.

Fourth Embodiment

In the inter-roller conveyance control device 100 of the first embodiment, the binary output unit applies positive and negative square waves to the tension shaft speed reference command value Vr0 so as to oscillate the tension deviation Te and calculate the proportional gain candidate value and the integral gain candidate value on the basis of the oscillating waveform of the tension deviation Te. But, the control gain can also be adjusted on the basis of a response waveform of the tension deviation Te when a step signal is applied to the tension shaft speed reference command value Vr0.

In the present embodiment, described is an inter-roller conveyance control device 400 that observes the tension deviation Te oscillating by applying the step signal, i.e., an excitation signal, to the tension shaft speed reference command value Vr0 and that stores a plurality of control parameters calculated on the basis of the observed waveform.

Figure 9:
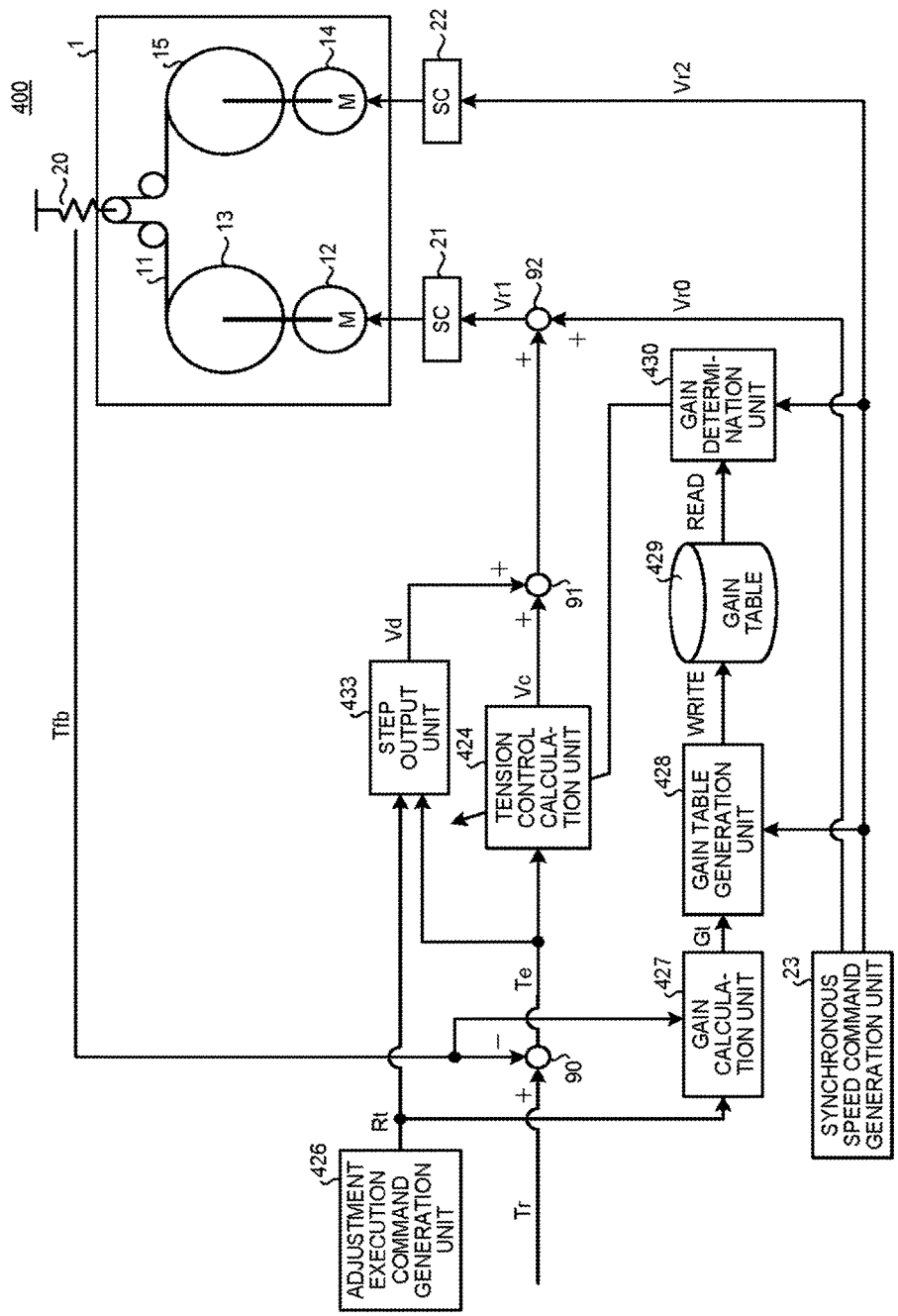
FIG. 9 is a block diagram illustrating the configuration of an inter-roller conveyance control device according to a fourth embodiment.

FIG. 9 is a block diagram illustrating the configuration of a fourth embodiment of the inter-roller conveyance control device according to the present invention. The inter-roller conveyance control device 400 illustrated in FIG. 9 monitors the tension deviation Te which oscillates by application of the step signal, i.e., the excitation signal, to the tension shaft speed reference command value Vr0 and stores, into a gain table, the plurality of control parameters calculated on the basis of the observed waveform. In FIG. 9, a block with the same reference numeral as that in FIG. 1 represents the same configuration as that of the first embodiment and thus is not described.

Although the present embodiment uses a tension shaft roller 13 to perform rolling-up and a speed shaft roller 15 to perform rolling-off, the present invention is not limited to such a configuration. That is, the speed shaft roller 15 can perform rolling-up while the tension shaft roller 13 performs rolling-off. Alternatively, each of the tension shaft roller 13 and the speed shaft roller 15 can be an intermediate shaft that performs only a feed operation during rolling-up or rolling-off but does not perform rolling-up or rolling-off.

The inter-roller conveyance control device 400 illustrated in FIG. 9 includes a control tension detector 20, a tension shaft speed controller 21, a speed shaft speed controller 22, a synchronous speed command generation unit 23, a tension control calculation unit 424, an adjustment execution command generation unit 426, a gain calculation unit 427, a gain table generation unit 428, a gain table 429, a gain determination unit 430, a step output unit 433, a subtractor 90, an adder 91, and an adder 92.

The tension control calculation unit 424 receives the tension deviation Te being a controlled tension deviation as input and outputs a sum of a proportional compensation, an integral compensation and a derivative compensation as a tension control correction value Vc, the proportional compensation being obtained by multiplying the tension deviation Te by a proportional gain that is the control parameter, the integral compensation being obtained by multiplying the tension deviation Te by an integral gain that is the control parameter and integrating the outcome, and the derivative compensation being obtained by multiplying the tension deviation Te by a derivative gain that is the control parameter and differentiating the outcome.

The adjustment execution command generation unit 426 generates an adjustment execution command Rt that is a signal representing on or off upon receiving an instructional input made by an external operation, for example. The adjustment execution command generation unit basically changes the adjustment execution command Rt from off to on by the external operation to output the on-signal only for an automatic adjustment period and then changes it back to the off-signal.

The step output unit 433 is an excitation signal generation unit. The step output unit 433 receives the adjustment execution command Rt as input and outputs a positive step signal with a predetermined magnitude D as an added value as an adjustment addition Vd at a point when the adjustment execution command generation unit 426 turns on the adjustment execution command Rt. The step output unit also outputs the added value for adjustment addition Vd of zero at a point when the adjustment execution command generation unit 426 turns off the adjustment execution command Rt.

Figure 10:
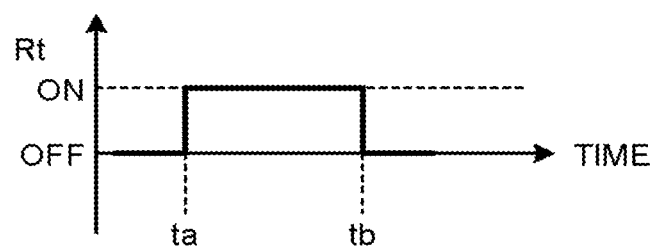
FIG. 10 is a time response graph of an adjustment execution command Rt of the inter-roller conveyance control device according to the fourth embodiment.
Figure 11:
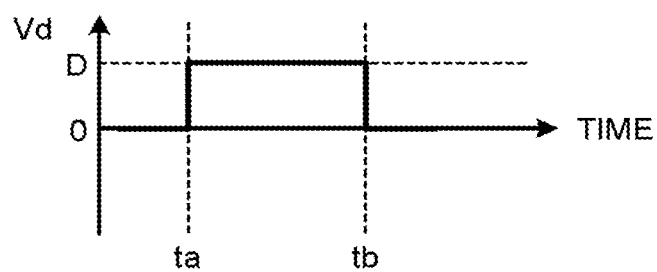
FIG. 11 is a time response graph of an added value for adjustment addition Vd in the inter-roller conveyance control device according to the fourth embodiment.
Figure 12:
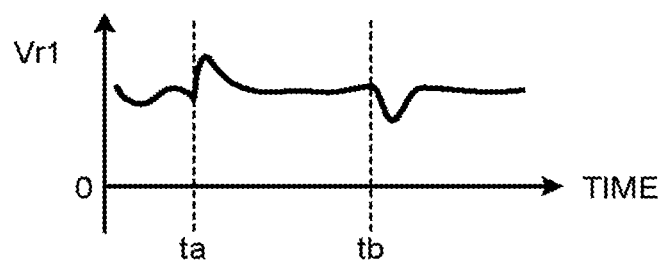
FIG. 12 is a time response graph of a tension shaft speed command value Vr1 of the inter-roller conveyance control device according to the fourth embodiment.
Figure 13:
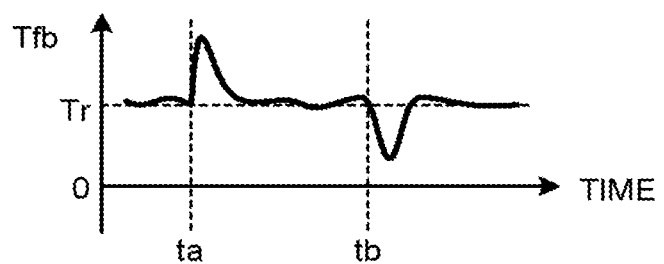
FIG. 13 is a time response graph of a detected tension value Tfb of the inter-roller conveyance control device according to the fourth embodiment.

Each of FIGS. 10 to 13 illustrates an example of a time response of the adjustment addition Vd and a detected tension value Tfb. Each of FIGS. 10 to 13 is a diagram illustrating a time response graph representing a behavior of the inter-roller conveyance control device 400 with a horizontal axis representing time, which is according to the present embodiment. FIG. 10 is the time response graph for the adjustment execution command Rt of the inter-roller conveyance control device 400 according to the present embodiment, FIG. 11 is the time response graph for the added value for adjustment addition Vd of the inter-roller conveyance control device 400 according to the present embodiment, FIG. 12 is the time response graph for a tension shaft speed command value Vr1 of the inter-roller conveyance control device 400 according to the present embodiment, and FIG. 13 is the time response graph for the detected tension value Tfb of the inter-roller conveyance control device 400 according to the present embodiment. Time to on the horizontal axis indicates the same time among FIGS. 10 to 13, and so does time tb.

The gain calculation unit 427 receives the detected tension value Tfb and the adjustment execution command Rt as input and calculates the proportional gain candidate value, the integral gain candidate value and a derivative gain candidate value which are used in the tension control calculation unit 424 on the basis of the detected tension value Tfb and the tension shaft speed command value Vr1 in an adjustment period during which the adjustment execution command Rt is turned on.

A transfer function using the tension shaft speed command value Vr1 as input and outputting the detected tension value Tfb is expressed as a transfer function P(s) of a control target by expression (1), for example.

[Expression 1]

$$PW = 1/(a_3 \cdot s^3 + a_2 \cdot s^2 + a_1 \cdot s + a_0) \quad (1)$$

The function P(s) in expression (1) is determined by a least squares method or the like on the basis of time series data of the tension shaft speed command value Vr1 and the detected tension value Tfb in the adjustment period during which the adjustment execution command Rt is turned on. Then, a transfer function C(s) of the tension control calculation unit 424 is expressed by expression (2) with Kp, Ki, and Kd indicating newly-calculated proportional gain candidate value, integral gain candidate value, and derivative gain candidate value of the tension control calculation unit 424, respectively.

[Expression 2]

$$C(s) = Kp + Ki/s + Kd \cdot s \quad (2)$$

Here, the proportional gain candidate value Kp, the integral gain candidate value Ki and the derivative gain candidate value Kd are calculated such that a coefficient of a characteristic equation of a closed loop control system matches a coefficient of a standard model of a Butterworth filter, or coefficients on both sides of expression (3) correspond with each other.

[Expression 3]

$$a_3 \cdot s^4 + a_2 \cdot s^3 + (a_1 + Kd) \cdot s^2 + (a_0 + Kp) \cdot s + Ki = s^4 + 2.6w \cdot s^3 + 3.4w^2 \cdot s^2 + 2.6w^3 \cdot s + w^4 \quad (3)$$

Note that w denotes a variable representing responsiveness of the closed loop control system. Each of the proportional gain candidate value Kp, the integral gain candidate value Ki, the derivative gain candidate value Kd and the variable w is uniquely determined by a coefficient comparison in expression (3).

The gain calculation unit 427 outputs a gain calculation result Gt including the proportional gain candidate value Kp, the integral gain candidate value Ki and the derivative gain candidate value Kd that are calculated at a point when the adjustment execution command generation unit 426 turns off the adjustment execution command Rt as well as a gain calculation completion signal that is an on or off-signal and turned on only when the gain calculation is completed.

The gain table generation unit 428 receives the gain calculation result Gt and a speed shaft speed command value Vr2 as input and writes, into the gain table 429, the calculated proportional gain candidate value Kp, integral gain candidate value Ki and derivative gain candidate value Kd in association with the conveyance condition variable corresponding to the speed shaft speed command value Vr2 only when the gain calculation completion signal included in the gain calculation result Gt is turned on.

The gain table 429 stores a plurality of the conveyance condition variables and a set of the proportional gain candidate value, the integral gain candidate value and the derivative gain candidate value associated with each conveyance condition variable. The gain table 429 being storage medium is adapted such that information can be written or read into/from the medium freely by an external operation. The storage medium can be a flash memory or a hard disk drive, for example.

The gain determination unit 430 receives the speed shaft speed command value Vr2 as input and reads, from the gain table 429, the proportional gain candidate value Kp, the integral gain candidate value Ki and the derivative gain candidate value Kd associated with the conveyance condition variable corresponding to the speed shaft speed command value Vr2 being received to set the values as values of the proportional gain, the integral gain and the derivative gain to be used in the tension control calculation unit 424.

At this time, among the proportional gain candidate value Kp, the integral gain candidate value Ki and the derivative gain candidate value Kd stored in the gain table 429, the gain determination unit 430 can read the proportional gain candidate value Kp, the integral gain candidate value Ki and the derivative gain candidate value Kd associated with the conveyance condition variable closest to the conveyance condition variable corresponding to the speed shaft speed command value Vr2 being received; or can read a plurality of each of the proportional gain candidate value Kp, the integral gain candidate value Ki and the derivative gain candidate value Kd and can calculate new proportional gain candidate value Kp, integral gain candidate value Ki and derivative gain candidate value Kd on the basis of the proportional gain candidate value Kp, the integral gain candidate value Ki and the derivative gain candidate value Kd being read.

Effects obtained by the inter-roller conveyance control device 400 of the present embodiment is described.

According to the present embodiment, the adjustment execution command generation unit 426 turns on the adjustment execution command Rt to allow the proportional gain, the integral gain and the derivative gain being the control parameters of the tension control calculation unit 424 to be adjusted to appropriate values. Therefore, the proportional gain candidate value, the integral gain candidate value and the derivative gain candidate value are stored in association with the speed shaft speed command value Vr2 into the gain table 429.

The inter-roller conveyance control device 400 of the present embodiment is operated as described above so as to store, into the gain table, the set of the proportional gain candidate value, the integral gain candidate value and the derivative gain candidate value appropriate for the plurality of conveyance conditions. Therefore, the gain of the tension control calculation unit can be set to an appropriate value in a short time under the conveyance speed condition being set independently of the status of a preset control gain of the tension control calculation unit and without the need of trial and error or knowledge based on experience; and a user can easily perform control to convey the object to be conveyed between rollers while holding the tension at a desired value even when the conveyance condition is changed.

Although the speed shaft speed command value Vr2 is used as the conveyance condition variable in the present embodiment, the tension shaft speed reference command value Vr0 can also be used as the conveyance speed variable in order to store, into the gain table, the appropriate control parameter according to the plurality of different conveyance speeds.

Although the transfer function of the control target is expressed as a third order delay system in the aforementioned example, the transfer function of the control target can be expressed and determined by a transfer function of a higher order such as a fifth order delay system or tenth order delay system so as to express the tension control calculation unit by a transfer function of a higher order. In such a case, the responsiveness of tension control can be adjusted more finely than PID control and can store therein the control parameter used at that time into the gain table.

Note that the transfer characteristic of the tension control calculation unit 424 has been described as the PID control with the proportional gain, the integral gain and the derivative gain as the control parameters in the present embodiment, but the present invention is not limited to such a case; but it can employ another type of control such as PI control, phase lead-lag compensation or an optimal regulator. The inter-roller conveyance control device 400 of the present embodiment need only change the value of the tension control correction value Vc in the adjustment operation. Accordingly, the value of the speed shaft speed command value Vr2 being the conveyance condition variable does not need to be changed in the adjustment period, so that the conveyance condition variable is not affected and that the appropriate control parameter can be calculated under each conveyance condition.

Fifth Embodiment

The proportional gain candidate value and the integral gain candidate value associated with the conveyance condition variable are stored into the gain table according to the inter-roller conveyance control devices described in the first to fourth embodiments. But, in the present embodiment, stored is a response parameter being a parameter of a transfer function of a control target associated with the conveyance condition variable. Here, the transfer function of the control target refers to a transfer function using a tension shaft speed command value Vr1 as input and outputting a detected tension value Tfb.

Figure 14:
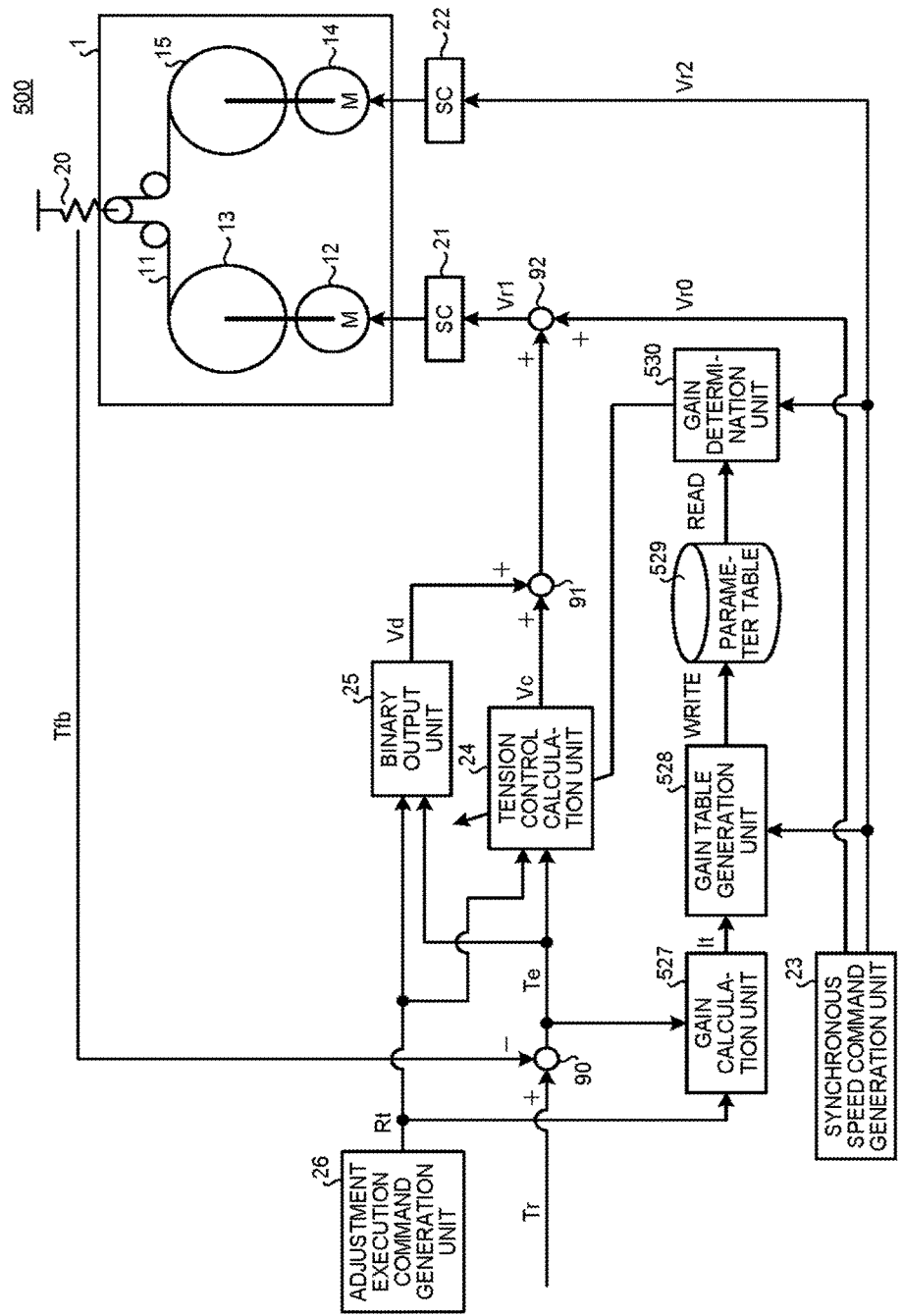
FIG. 14 is a block diagram illustrating the configuration of an inter-roller conveyance control device according to a fifth embodiment.

FIG. 14 is a block diagram illustrating the configuration of a fifth embodiment of an inter-roller conveyance control device according to the present invention. An inter-roller conveyance control device 500 illustrated in FIG. 14 uses a conveyance speed as the conveyance condition variable and stores, into a parameter table, the parameter of the transfer function of the control target associated with the conveyance condition variable. Note that in FIG. 14, a block with the same reference numeral as that in FIG. 1 represents the same configuration as that of the first embodiment and thus will not be described.

The inter-roller conveyance control device 500 illustrated in FIG. 14 includes a control tension detector 20, a tension shaft speed controller 21, a speed shaft speed controller 22, a synchronous speed command generation unit 23, a tension control calculation unit 24, a binary output unit 25, an adjustment execution command generation unit 26, a control target identification unit 527, a parameter table generation unit 528, a parameter table 529, a gain determination unit 530, a subtractor 90, an adder 91 and an adder 92.

The control target identification unit 527 receives a tension deviation Te and an adjustment execution command Rt as input; measures an oscillation period and an amplitude of the tension deviation Te in an automatic adjustment period during which the adjustment execution command Rt is turned on; and calculates the parameter of the transfer function of the control target on the basis of a result of the measurement. Specifically, the control target identification unit 527 approximates the transfer function of the control target with a product of an integrator and a dead time calculator so as to calculate a control target integral gain value being an integral gain value of the integrator and a control target dead time value being a dead time value of the dead time calculator. An identification completion signal being an on or off-signal is turned on at a point when the adjustment execution command Rt is turned off as well as the calculation of the control target integral gain value and the control target dead time value is completed. The identification completion signal can also be referred to as a calculation completion signal. The identification completion signal is turned on once, and then turned back off. The control target identification unit 527 outputs an identification result It including the identification completion signal as well as the control target integral gain value and control target dead time value being calculated.

The parameter table generation unit 528 receives the identification result It and a speed shaft speed command value Vr2 as input, and uses the value of the speed shaft speed command value Vr2 as the conveyance condition variable so as to associate the conveyance condition variable with each of the control target integral gain value and the control target dead time value included in the identification result It and writes, into the parameter table 529, the control target integral gain value and the control target dead time value associated with the conveyance condition variable and the speed shaft speed command value Vr2. The parameter table generation unit 528 writes these values into the parameter table 529 at a point when the identification completion signal included in the received identification result It is turned on.

The parameter table 529 stores a plurality of the conveyance condition variables and a pair made up of the control target integral gain value and the control target dead time value associated with each conveyance condition variable. The parameter table 529 being storage medium can be adapted such that information can be written and read into/from the medium by an external operation, which is not limited to a specific configuration. The storage medium can be a flash memory or a hard disk drive, for example.

The gain determination unit 530 receives the speed shaft speed command value Vr2 as input and reads, from the parameter table 529, the control target integral gain value and the control target dead time value associated with the conveyance condition variable corresponding to the speed shaft speed command value Vr2 being received; calculates the proportional gain value and the integral gain value from the control target integral gain value and the control target dead time value; and sets or changes the values as values of the proportional gain and the integral gain of the tension control calculation unit 24. At this time, among the control target integral gain value and the control target dead time value stored in the parameter table 529, the gain determination unit 530 can read the control target integral gain value and the control target dead time value associated with the conveyance condition variable closest to the conveyance condition variable corresponding to the value of the speed shaft speed command value Vr2 being received; or can read a plurality of each of the control target integral gain values and the control target dead time values to calculate new control target integral gain value and control target dead time value on the basis of the control target integral gain value and the control target dead time value being read. When the gain determination unit 530 uses the conveyance condition variable as input to calculate the control parameter from the control target integral gain value and the control target dead time value being read from the parameter table 529 and changes the control parameter of the tension control calculation unit 24 as described above, the control parameter calculated from a pair made up of the control target integral gain value and the control target dead time value appropriate for the conveyance condition are used in tension control from among the plurality of pairs of the control target integral gain values and the control target dead time values stored in the parameter table 529. Therefore, a user can easily change the control parameter accompanying a change in the conveyance condition. Although the control parameter based on the control target integral gain value and the control target dead time value can be calculated by using a Ziegler-Nichols tuning rule, for example, another tuning rule can be used.

Effects obtained by the inter-roller conveyance control device 500 of the present embodiment is described.

In general, a response characteristic of the tension control varies depending on a rule of adjustment when the control parameter is adjusted on the basis of the transfer function of the control target. The Ziegler-Nichols tuning rule for example has the characteristics of providing a favorable disturbance response but resulting in increased overshoots with respect to a command response. According to the inter-roller conveyance control device 500 of the present embodiment, a user of the inter-roller conveyance control device changes the tuning rule of the control parameter in the gain determination unit 530 after the parameter table is generated, whereby the parameter of the transfer function of the control target stored in the parameter table 529 is used to be able to obtain the control parameter calculated from a plurality of tuning rules. The response characteristic of the tension control can thus be changed even after the parameter table is generated.

The parameters stored in the parameter table 529 of the inter-roller conveyance control device 500 are the control target integral gain value and the control target dead time value in the present embodiment; but, as the parameters stored in the parameter table, can be set a proportional gain value and a time constant value obtained by approximating the transfer function of the control target with a transfer function of a first order delay, or coefficients of a denominator polynomial and a numerator polynomial obtained by approximating the control target with a higher order transfer function, for example.

Although the transfer function of the control target being stored is the transfer function receiving the tension shaft speed command value Vr1 as input and outputting the detected tension value Tfb in the inter-roller conveyance control device 500 of the present embodiment, a similar effect can be obtained with a transfer function including a response characteristic of the detected tension value Tfb with respect to a peripheral speed of the tension shaft roller, since the control gain of the tension control calculation unit 24 can be determined from the transfer function.

The inter-roller conveyance control device 500 of the present embodiment need only change the value of the tension control correction value Vc in the adjustment operation. Accordingly, the value of the speed shaft speed command value Vr2 being the conveyance condition variable does not need to be changed in the adjustment period, so that the conveyance condition variable is not affected and that the appropriate control parameter can be calculated under each conveyance condition.

The configuration described in the aforementioned embodiments illustrates an example of the content of the present invention and can be combined with another known technique or partly be omitted or modified without departing from the gist of the present invention.

INDUSTRIAL APPLICABILITY

The inter-roller conveyance control device according to the present invention is useful when it is required to perform the tension control with the favorable response performance, and is particularly suitable for an inter-roller conveyance control device in which the conveyance condition is changed frequently.

REFERENCE SIGNS LIST

1 inter-roller conveyance mechanism, 11 object to be conveyed, 12 tension shaft motor, 13 tension shaft roller, 14 speed shaft motor, 15 speed shaft roller, 16 roller diameter sensor, 20 control tension detector, 21 tension shaft speed controller, 22 speed shaft speed controller, 23 synchronous speed command generation unit, 24, 424 tension control calculation unit, 25 binary output unit, 26, 426 adjustment execution command generation unit, 27, 427 gain calculation unit, 28, 228, 328, 428 gain table generation unit, 29, 429 gain table, 30, 230, 330, 430 gain determination unit, 90 subtractor, 91, 92 adder, 100, 200, 300, 400, 500 inter-roller conveyance control device, 231 roller diameter calculation unit, 332 elapsed time measurement unit, 433 step output unit, 527 control target identification unit, 528 parameter table generation unit, 529 parameter table, 530 gain determination unit.

The invention claimed is:

1. An inter-roller conveyance control device that conveys an object to be conveyed between a speed shaft roller and a tension shaft roller while providing tension, the device comprising:
   a control tension detector that detects a control tension value of the object to be conveyed;
   a tension control calculation unit that calculates and outputs a tension control correction value such that a tension deviation is decreased, the calculation being on a basis of a control parameter and a tension deviation that is a deviation between a set tension command value and the control tension value;
   an adjustment execution command generation unit that
      turns on an adjustment execution command that is an on or off-signal from an external input, and
      turns off the adjustment execution command after an adjustment period;
   an excitation signal generation unit that, when the adjustment execution command is turned on, adds an added value for adjustment to the tension control correction value while the object to be conveyed is being conveyed;
   a tension shaft speed controller that
      receives, as input, a tension shaft speed command value obtained by summing the tension control correction value, the added value for adjustment, and a tension shaft speed reference command value, and
      performs control such that a conveyance speed of the tension shaft roller corresponds to the tension shaft speed command value;
   a speed shaft speed controller that
      receives, as input, a speed shaft speed command value that changes in synchronization with the tension shaft speed reference command value, and
      performs control such that a conveyance speed of the speed shaft roller corresponds to the speed shaft speed command value;
   a gain calculation unit that
      calculates, on the basis of the tension deviation in the adjustment period during which the adjustment execution command is turned on, a control parameter candidate value, as an appropriate control parameter, and
      outputs the control parameter candidate value;
   a gain table generation unit that, after calculation by the gain calculation unit is completed, associates the control parameter candidate value with a conveyance condition variable that changes while the object to be conveyed is being conveyed and that affects an appropriate value of the control parameter; and
   a gain table that stores therein a plurality of pairs of the conveyance condition variable and the control parameter candidate value.

2. The inter-roller conveyance control device according to claim 1, further comprising a gain determination unit that changes the control parameter used in the tension control calculation unit on a basis of the control parameter candidate value that is read from the gain table with the conveyance condition variable being as input.

3. The inter-roller conveyance control device according to claim 2, wherein
the gain determination unit
corrects the control parameter candidate value read from the gain table, and
changes a value of the control parameter in the tension control calculation unit.

4. The inter-roller conveyance control device according to claim 1, wherein
the conveyance condition variable is a variable determined by a conveyance speed of the object to be conveyed.

5. The inter-roller conveyance control device according to claim 1, wherein
the conveyance condition variable is a variable determined by a roller diameter of the tension shaft roll.

6. The inter-roller conveyance control device according to claim 1, wherein
the conveyance condition variable is a variable determined by time period elapsed from the start of conveying the object to be conveyed.

7. The inter-roller conveyance control device according to claim 1, wherein
the excitation signal generation unit is operated according to a limit cycle method.

8. An inter-roller conveyance control device that conveys an object to be conveyed between a speed shaft roller and a tension shaft roller while providing tension, the device comprising:
a control tension detector that detects a control tension value of the object to be conveyed;
a tension control calculation unit that calculates and outputs a tension control correction value such that a tension deviation is decreased, the calculation being on a basis of a control parameter and tension deviation that is a deviation between a set tension command value and the control tension value;
an adjustment execution command generation unit that turns on an adjustment execution command that is an on or off-signal from an external input, and
turns off the adjustment execution command after an adjustment period;
an excitation signal generation unit that, when the adjustment execution command is turned on, adds an added value for adjustment to the tension control correction value while the object to be conveyed is conveyed;
a tension shaft speed controller that
receives, as input, a tension shaft speed command value obtained by adding the tension control correction value, the added value for adjustment, and a tension shaft speed reference command value, and
performs control such that a conveyance speed of the tension shaft roller corresponds to the tension shaft speed command value;
a speed shaft speed controller that
receives, as input, a speed shaft speed command value that changes in synchronization with the tension shaft speed reference command value, and
performs control such that a conveyance speed of the speed shaft roller corresponds to the speed shaft speed command value;
a control target identification unit that
identifies, on the basis of the tension deviation in the adjustment period during which the adjustment execution command is turned on, a transfer function representing a response characteristic of the control tension value with respect to a conveyance speed of the tension shaft roll, and
outputs an identification result including a response parameter that is a coefficient of the transfer function;
a parameter table generation unit that, after identification by the control target identification unit is completed, associates the response parameter with a conveyance condition variable that changes while the object to be conveyed is conveyed and affects an appropriate value of the control parameter; and
a parameter table that stores therein a plurality of pairs of the conveyance condition variable and the response parameter.

* * * * *